(12) United States Patent
Brink

(10) Patent No.: US 6,193,055 B1
(45) Date of Patent: Feb. 27, 2001

(54) CONVEYOR BELT SUPPORT

(75) Inventor: Arend Jacobus Brink, Witbank (ZA)

(73) Assignee: Scorpio Conveyor Products (Proprietary) Limited, Witbank (ZA)

( * ) Notice: Subject to any disclaimer, the term of this patent is extended or adjusted under 35 U.S.C. 154(b) by 0 days.

(21) Appl. No.: 09/134,577

(22) Filed: Aug. 14, 1998

(30) Foreign Application Priority Data

Sep. 29, 1997 (ZA) ...................................... 97/8689

(51) Int. Cl.[7] .................................................. B65G 15/08
(52) U.S. Cl. .......................... 198/827; 198/826; 198/830; 198/861.1
(58) Field of Search ..................................... 198/823, 826, 198/827, 829, 830, 861.1

(56) References Cited

U.S. PATENT DOCUMENTS

| | | | |
|---|---|---|---|
| 909,833 | * | 1/1909 | Vrooman . |
| 2,427,590 | * | 9/1947 | Conners . |
| 2,724,490 | * | 11/1955 | Barnish . |
| 3,033,352 | * | 5/1962 | Kain . |
| 3,089,580 | * | 5/1963 | Dilgard . |
| 3,092,240 | * | 6/1963 | Tyler et al. . |
| 3,100,042 | * | 8/1963 | Presti . |
| 3,126,090 | * | 3/1964 | Bitzer . |
| 3,219,177 | * | 11/1965 | Reilly . |
| 3,459,291 | * | 8/1969 | Metcalfe . |
| 4,043,447 | * | 8/1977 | Donnelly et al. ..................... 198/192 |
| 4,166,528 | * | 9/1979 | Renner .................................. 198/825 |
| 4,280,619 | * | 7/1981 | Ward et al. ........................... 198/823 |
| 4,787,504 | * | 11/1988 | Schultz ................................. 198/782 |
| 5,161,675 | * | 11/1992 | Engst et al. .......................... 198/819 |

* cited by examiner

Primary Examiner—Christopher P. Ellis
Assistant Examiner—Khoi H. Tran
(74) Attorney, Agent, or Firm—Jones, Tullar & Cooper, P.C.

(57) ABSTRACT

A support structure for a conveyor belt which includes two upwardly extending, pivotally mounted, support arms, a garland of conveyor idler rollers suspended between upper ends of the support arms and, for each support arm, respective biasing means which permits pivotal movement of the support arm, towards the other support arm, only when the support arm exerts a force on the respective biasing means in excess of a predetermined load.

8 Claims, 2 Drawing Sheets

CONVEYOR BELT SUPPORT

BACKGROUND TO THE INVENTION

This invention relates to a support for a conveyor belt. Conveyor belts, at loading points, can be subjected to considerable impact forces. For example a conveyor belt which carries ore may be expected to withstand the impact of rocks with a nominal size in excess of 150 mm falling through heights of up to 4 meters. The impact force on a conveyor belt carrying in excess of 2000 tons per hour may therefore be substantial and, unless adequate measures are taken, the belt or the supporting structure may be damaged.

Shock absorbing devices, which are used to overcome the aforementioned adverse effects, must physically be of a size which enable them to be installed in the available space. In certain installations space is at a premium and, as a general rule, it can be said that the width of a shock absorbing system should not exceed the width of the normal supporting structure of the belt.

Another factor is that an impact absorbing structure, under normal operating conditions, should not affect the height of a belt once it has been set to a desired or optimum operating level.

Furthermore, it is frequently necessary to load a conveyor belt at or near a tail pulley, i.e. in a region where the belt is in transition from the flat tail pulley to the fully troughed carrying condition. A shock absorbing device should, therefore, provide a means of adjustment which takes into account the changing cross-sectional arrangement of the belt in the load zone.

SUMMARY OF THE INVENTION

The invention provides a support structure for a conveyor belt which includes at least one support member which supports at least one conveyor idler roller, and biasing means, which is biased to a predetermined load, and which acts on the support member in such a way that the support member is movable only when it exerts a force on the biasing means in excess of the predetermined load.

The support member may support the conveyor idler roller in any suitable way, directly or indirectly.

Means may be provided for adjusting the value or level of the predetermined load.

The biasing means may take on any suitable form and, for example, may comprise or include one or more elastomeric or metallic members.

In one form of the invention the biasing means includes a plurality of components which are assembled to provide a desired spring characteristic. Each component may for example comprise an elastomeric element.

In a preferred form of the invention the biasing means includes a number of elastomeric rings which are axially aligned with each other.

In an alternative arrangement use is made of metallic cup washers, or springs of any suitable type.

The biasing means may be biased to the said predetermined load by applying an axially directed force, equal to the said predetermined load, to the elastomeric rings.

Connection means may be provided between the biasing means and the support member. The connection means may be adjustable relatively to the biasing means to position the support member at a desired orientation.

The support member may be mounted to suitable supporting stringers and beams in any appropriate way and, preferably, the support member is pivotally attached thereto.

The support structure of the invention is particularly suited for supporting a garland of conveyor idlers although it is to be understood that the scope of the invention is not confined to this particular application.

In a preferred embodiment the support structure of the invention includes a base member, at least one support member which is pivotally attached to the base member, means on the support member for engagement, with at least one conveyor idler roller, and biasing means, biased to a predetermined load, which acts between the base member and the support member and which is movable, in a first direction, when the support member exerts a force on the biasing means in excess of the predetermined load.

The first direction may be inclined downwards.

The support member may be adjustable in length in any suitable way, e.g. telescopically, to accommodate varying belt troughing angles.

The support structure may include adjustment means for adjusting the orientation of the support member relatively to the base member.

The invention also provides a support structure for a conveyor belt which includes two spaced support members, conveyor idler rollers positioned between, and secured to, upper ends of the support members, means pivotally connecting respective lower ends of the support members to underlying supporting structure, and, for each support member a respective biasing arrangement which is biased to a predetermined load and which permits pivotal movement of the respective support member, in a direction which is downwardly inclined from a side of the belt towards an underside thereof, only when the support member exerts a force on the respective biasing arrangement in excess of the said predetermined load.

The invention further extends to a support structure for a conveyor belt which includes two upwardly extending, pivotally mounted, support arms, a garland of conveyor idler rollers suspended between upper ends of the support arms and, for each support arm, respective biasing means which permits pivotal movement of the support arm, towards the other support arm, only when the support arm exerts a force on the respective biasing means in excess of a predetermined load.

BRIEF DESCRIPTION OF THE DRAWINGS

The invention is further described by way of examples with reference to the accompanying drawings in which.

DESCRIPTION OF PREFERRED EMBODIMENTS

Figure 1:
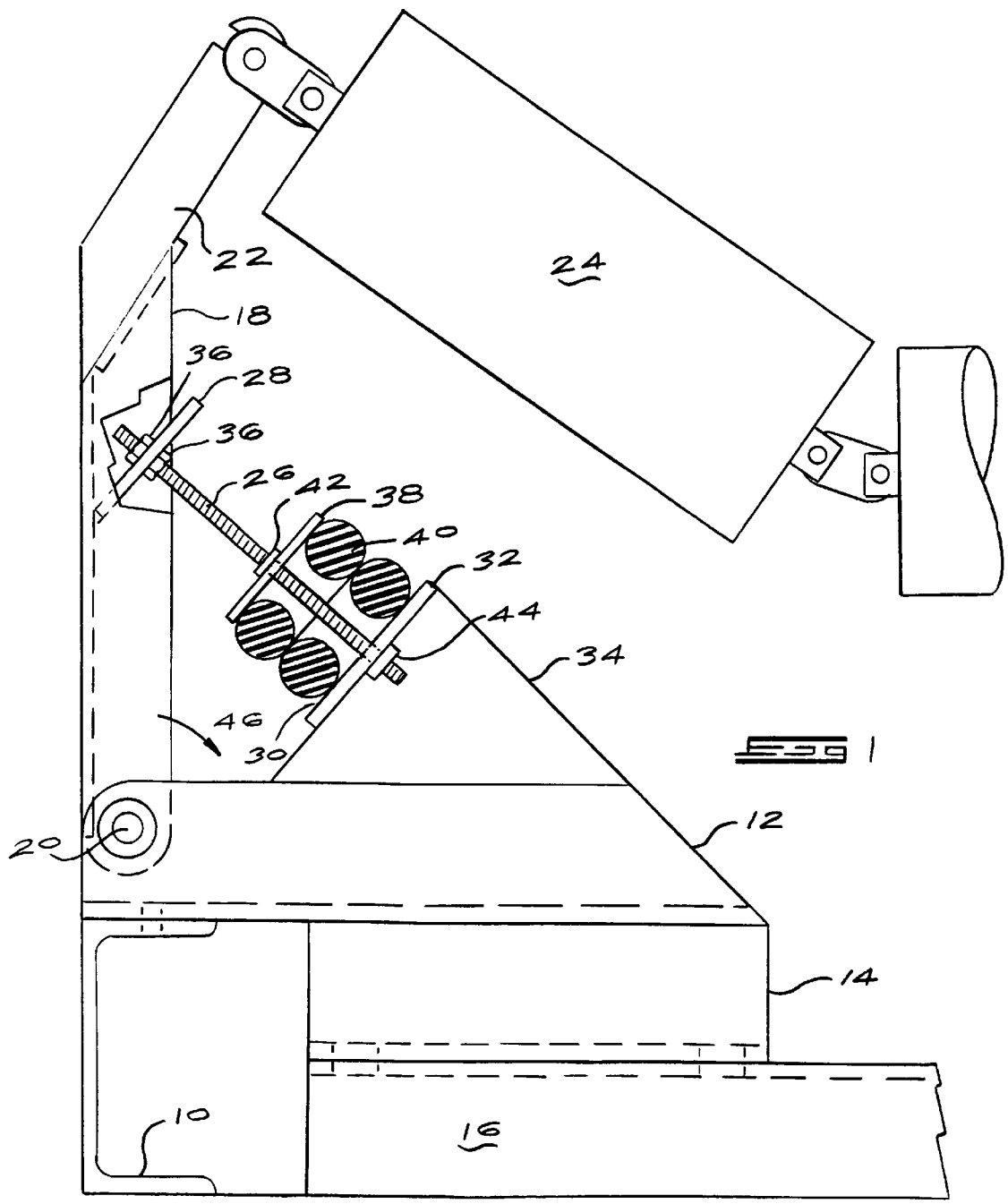
FIG. 1 is a front view of portion of a support structure according to one form of the invention.

FIG. 1 of the accompanying drawings is a front view of a portion of a support structure for a conveyor belt according to one form of the invention.

FIG. 1 illustrates a stringer 10 of a conveyor support frame to which is attached a base member 12. The base member has a downwardly depending connector 14 which is attached to a transversely extending beam 16.

FIG. 1 illustrates a left hand side of the support structure of the invention. It is to be understood that the right hand side has essentially the same arrangement and that the beam 16, at its right hand side, is connected to a similar connector and base member which are spaced from the illustrated components by a distance which is substantially equal to the width of the belt which is supported by the structure.

A support member or arm 18 is attached to the base member 12 at a pivot point 20 and extends upwardly from the base member. At its upper end the support arm has a component 22 from which is suspended, in a known manner, a garland of conveyor idler rollers 24.

A rod 26 extends between a plate 28 which is fixed to the support arm and an inclined face 30 of a plate 32 which is welded to gussets 34 fixed to the base member 12. The rod is threaded and two nuts 36 which are engaged with the rod secure the rod to the plate 28. Towards its lower end the rod has a plate 38 engaged with it which bears downwardly on a number of rings 40 which are threaded onto the rod and which rest on the plate 32. Nuts 42 and 44 are engaged with the rod 26. The upper nut 42 forces the plate 38 against the rings while the lower nut 44 secures the rod to the plate 32. By adjusting the nuts 36, 42 and 44 the orientation of the support arm 18 can be varied, and by adjusting the nuts 42 and 44 the pressure on the rings can be varied.

The rings 40 are, in this example of the invention, made from a suitable elastomeric material with a desired stiffness e.g. rubber with an appropriate hardness. The number of rings which are employed may be varied according to requirement in order to impart to the assembly a desired spring or stiffness characteristic. By rotating the nuts 42 and 44 along the rod the plate 38 can be moved in the axial direction of the rod, relatively to the plate 32, so that the rings are biased to a greater or lesser extent. The rings on each side of the belt are in practice biased to predetermined loads the sum of which equals the impact load which the garland of idlers may be expected to sustain without movement.

The adjustments of the nuts 42 and 44 may alter the orientation of the support arm 18. If this does occur then the nuts 36 are adjusted to bring the support arm to a desired position.

The support structure shown in the accompanying drawing is intended for supporting a conveyor belt, which runs over the garland of idlers, at a loading point, i.e. at a point at which material is discharged onto the belt carried by the garland. When the belt is loaded a force is exerted on the support arm which tends to pivot the support arm in the direction of an arrow 46, about the pivot point 20. The support arm is however not able to move in the direction of the arrow until such time as it exerts a force on the rings 40 in excess of the predetermined biasing load.

If the sum of the predetermined biasing loads on the two support arms, on opposed sides of the belt, is chosen to correspond with the maximum load which the garland will carry under normal operating conditions of the belt then it is apparent that, for all loads from zero up to the said maximum load, the support arms will not deflect from their normal operating positions.

On the other hand if the conveyor belt carried by the garland is subjected to an impact which imparts, via the support arms, loading on the respective sets of biasing rings 40 in excess of the sum of the predetermined biasing forces, then each of the arms will pivot in a direction which is downwardly inclined, from a side of the belt towards an underside thereof and, in so doing, permit the impact load to be absorbed in such a way that the likelihood of the conveyor belt, or the supporting structure for the belt, being damaged, is reduced.

The support structure of the invention can be used for supporting a conveyor belt, in its loading area, in the space which is normally available. Thus it is to be noted that the beam 16 extends between opposed stringers 10 and that the support arm 18 extends upwardly in line with the stringer 10. The support arm, in addition, has a height which is the normal height in that the garland of conveyor idlers 24 is positioned, by means of the support arm, at the height at which the garland would normally be supported.

As indicated in the preamble hereof it is also desirable if provision can be made for adjusting shock absorbing or, more generally, conveyor support devices in such a way that adequate support can be provided for a conveyor belt in the transition region between a pulley and a troughed state. It is to be noted that the length of the transition region will vary from installation to installation. The degree of troughing can also vary substantially. It is desirable therefore to provide some mechanism whereby on site adjustment can be effected to take account of variations of this type.

Figure 2:
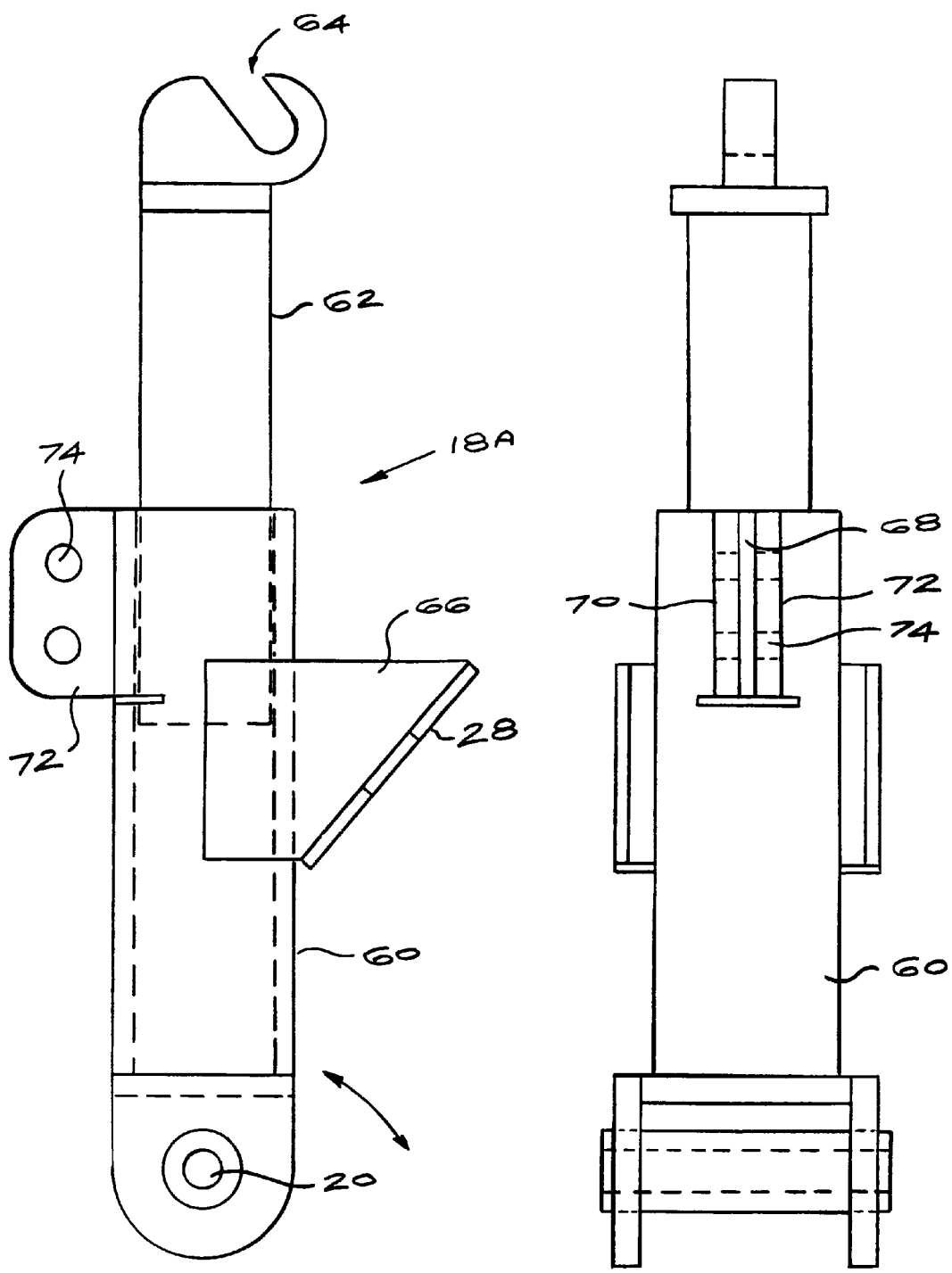
FIG. 2 illustrates a modified support according to the invention.

FIG. 2 contains two views, at right angles to one another, from the side, of a support arm 18A which can be used in place of the arm 18 shown in FIG. 1. The arm has a lower component 60 with a lower pivot point 20, and an upper component 62 which is telescopically engaged with the lower component. At its upper end the component 62 has a hook-shaped recess 64 which receives one end of a garland of conveyor idlers, not shown.

A plate 28 faces obliquely downwardly and is fixed to gussets 66 extending from the lower component 60.

At its upper end the component 60 is split by a longitudinally extending slit 68 and two side-by-side flanges 70 and 72 are respectively positioned on opposed sides of the slit. The flanges have registering holes 74.

The effective length of the support arm 18A can be adjusted by telescopically moving the upper component 62 relatively to the lower component 60. Once the arm 18A has a desired length the components can be locked to each other by means of bolts, not shown, which pass through the holes 74 and which, when tightened, draw the split upper end of the component 60 into tight frictional engagement with the circumscribed portion of the component 62.

As has already been noted the inclination of the arm 18A can be adjusted pivoting the arm about the point 20 and can be held in a desired angular orientation using a structure which is similar to that shown in FIG. 1.

It thus becomes possible to adjust the support arm in height and in angular orientation to accommodate the exact point at which the arm is installed and to take account of the degree of troughing of the belt which is being supported. This objective can be achieved without affecting the impact absorbing characteristic already referred to.

The rubber rings can be replaced by any suitable components e.g. metallic cup washers or coil springs which act between the plates 32 and 38, hydraulic devices, and any appropriate combination of such suitable components.

What is claimed is:

1. A conveyor belt support comprising:
   a base member;
   at least one support member having a first end and a second end;
   a pivot connection between said at least one support member first end and said base member;
   a conveyor idler roller attachment formation at said second end of said at least one support member;
   biasing means acting between said base member and said at least one support member intermediate said support member first and second ends to orient said at least one support member with respect to said base member; and means biasing said biasing means to a predetermined load, said biasing means being movable in a first direction when said at least one support member exerts a force on said biasing means in excess of said predetermined load.

2. The conveyor belt support of claim 1 wherein said biasing means includes a number of elastomeric rings which are axially aligned with each other.

3. The conveyor belt support of claim 2 further including means for applying an axially directed force, equal to said predetermined load, to said elastomeric rings.

4. The conveyor belt support of claim 1 further including means for adjusting said orientation of said support member.

5. The conveyor belt support of claim 4 further including adjustable connecting means between said biasing means and said support member to position said support member at a desired orientation.

6. The conveyor belt support of claim 1 wherein said support member is adjustable in length between said base member and said second end.

7. The conveyor belt support of claim 1 wherein said biasing means includes an elastomeric biasing means.

8. The conveyor belt support of claim 1 further including a second support member pivotably attached to said base and spaced from said first support member, and conveyor idler rollers suspended between said spaced first and second support members.

* * * * *